United States Patent
Xiao et al.

(10) Patent No.: US 11,749,832 B2
(45) Date of Patent: Sep. 5, 2023

(54) METHODS FOR PRE-LITHIATING LITHIUM ION BATTERIES

(71) Applicant: GM GLOBAL TECHNOLOGY OPERATIONS LLC, Detroit, MI (US)

(72) Inventors: Xingcheng Xiao, Troy, MI (US); Xingyi Yang, Sterling Heights, MI (US); Mark W. Verbrugge, Troy, MI (US); Raghunathan K, Troy, MI (US); Qinglin Zhang, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 733 days.

(21) Appl. No.: 16/689,748

(22) Filed: Nov. 20, 2019

(65) Prior Publication Data

US 2021/0151787 A1    May 20, 2021

(51) Int. Cl.
*H01M 10/0525* (2010.01)
*H01M 4/485* (2010.01)
(Continued)

(52) U.S. Cl.
CPC ........ *H01M 10/0525* (2013.01); *C01G 53/50* (2013.01); *H01M 4/13* (2013.01);
(Continued)

(58) Field of Classification Search
CPC ......... H01M 10/0525; H01M 10/0562; H01M 4/485; H01M 4/525
See application file for complete search history.

(56) References Cited

U.S. PATENT DOCUMENTS

| 7,736,805 B2 | 6/2010 | Nazri et al. |
| 8,101,152 B1 | 1/2012 | Halalay et al. |
| (Continued) | | |

FOREIGN PATENT DOCUMENTS

| CN | 112825352 A | 5/2021 |
| DE | 102020127587 A1 | 5/2021 |
| WO | 2017166147 A1 | 10/2017 |

OTHER PUBLICATIONS

Halalay, Ion C. et al., U.S. Appl. No. 16/160,799, filed Oct. 15, 2018 entitled, "Method for Making Silicon-Containing Composite Electrodes for Lithium-Based Batteries," 47 pages.
(Continued)

*Primary Examiner* — Jonathan Crepeau
*Assistant Examiner* — Angela J Martin
(74) *Attorney, Agent, or Firm* — Harness, Dickey & Pierce, P.L.C.

(57) ABSTRACT

Lithiated electrodes, electrochemical cells including lithiated electrodes, and methods of making the same are provided. The method includes lithiating at least one electrode in an electrochemical cell by applying current across a first current collector of the at least one electrode to a second current collector of an auxiliary electrode. The electrochemical cell may be disposed within a battery packaging and the auxiliary electrode may be disposed within the battery packaging adjacent to an edge of the electrochemical cell. The at least one electrode may include a first electroactive layer disposed on or near one or more surfaces of the first current collector, and the auxiliary electrode may include a second electroactive layer disposed at or near one or more surfaces of the second current collector. The method may further include extracting the auxiliary electrode from the battery packaging and sealing the battery packaging, which includes the pre-lithiated electrochemical cell.

19 Claims, 5 Drawing Sheets

(51) Int. Cl.

| | | |
|---|---|---|
| *H01M 4/525* | (2010.01) | |
| *H01M 10/058* | (2010.01) | |
| *H01M 4/13* | (2010.01) | |
| *H01M 4/139* | (2010.01) | |
| *H01M 50/105* | (2021.01) | |
| *C01G 53/00* | (2006.01) | |
| *H01M 10/0562* | (2010.01) | |

(52) U.S. Cl.
CPC ............ *H01M 4/139* (2013.01); *H01M 4/485* (2013.01); *H01M 4/525* (2013.01); *H01M 10/058* (2013.01); *H01M 10/0562* (2013.01); *H01M 50/105* (2021.01)

(56) References Cited

U.S. PATENT DOCUMENTS

| | | |
|---|---|---|
| 8,399,138 B2 | 3/2013 | Timmons |
| 8,420,259 B2 | 4/2013 | Xiao et al. |
| 8,440,350 B1 | 5/2013 | Verbrugge et al. |
| 8,642,201 B2 | 2/2014 | Cheng et al. |
| 8,658,295 B2 | 2/2014 | Cheng et al. |
| 8,679,680 B2 | 3/2014 | Vanimisetti et al. |
| 8,835,056 B2 | 9/2014 | Xiao et al. |
| 8,859,144 B2 | 10/2014 | Xiao |
| 8,999,584 B2 | 4/2015 | Jiang et al. |
| 9,005,811 B2 | 4/2015 | Xiao et al. |
| 9,012,075 B2 | 4/2015 | Verbrugge et al. |
| 9,034,519 B2 | 5/2015 | Xiao et al. |
| 9,093,705 B2 | 7/2015 | Xiao et al. |
| 9,142,830 B2 | 9/2015 | Xiao et al. |
| 9,153,819 B2 | 10/2015 | Huang et al. |
| 9,302,914 B2 | 4/2016 | Liu et al. |
| 9,356,281 B2 | 5/2016 | Verbrugge et al. |
| 9,362,551 B2 | 6/2016 | Sachdev et al. |
| 9,362,552 B2 | 6/2016 | Sohn et al. |
| 9,379,374 B2 | 6/2016 | Liu et al. |
| 9,531,004 B2 | 12/2016 | Xiao et al. |
| 9,564,639 B2 | 2/2017 | Huang |
| 9,570,752 B2 | 2/2017 | Huang et al. |
| 9,577,251 B2 | 2/2017 | Xiao et al. |
| 9,583,767 B2 | 2/2017 | Verbrugge et al. |
| 9,780,361 B2 | 10/2017 | Xiao et al. |
| 9,905,847 B2 | 2/2018 | Dadheech et al. |
| 9,923,189 B2 | 3/2018 | Xiao |
| 10,062,898 B2 | 8/2018 | Xiao |
| 10,141,569 B2 | 11/2018 | Verbrugge et al. |
| 10,164,245 B2 | 12/2018 | Huang |
| 10,211,452 B2 | 2/2019 | Jiang et al. |
| 10,326,136 B2 | 6/2019 | Xiao et al. |
| 10,396,360 B2 | 8/2019 | Xiao et al. |
| 10,424,784 B2 | 9/2019 | Yang et al. |
| 10,854,882 B2 | 12/2020 | Halalay et al. |
| 10,868,307 B2 | 12/2020 | Huang |
| 10,950,846 B2 | 3/2021 | Xiao et al. |
| 11,228,037 B2 | 1/2022 | Huang et al. |
| 11,349,119 B2 | 5/2022 | Halalay et al. |
| 2008/0026116 A1 | 1/2008 | Chisholm et al. |
| 2011/0133699 A1* | 6/2011 | Howard ............... H01M 4/131 429/231.1 |
| 2012/0100403 A1 | 4/2012 | Wang et al. |
| 2012/0229096 A1 | 9/2012 | Nazri |
| 2012/0328927 A1 | 12/2012 | Timmons et al. |
| 2013/0099159 A1 | 4/2013 | Halalay et al. |
| 2015/0263379 A1* | 9/2015 | Xiao .................. H01M 4/0447 205/59 |
| 2017/0098817 A1 | 4/2017 | Yu et al. |
| 2017/0271678 A1 | 9/2017 | Yang et al. |
| 2017/0324119 A1 | 11/2017 | Powell, Jr. et al. |
| 2018/0205114 A1 | 7/2018 | Pauric et al. |
| 2018/0287139 A1 | 10/2018 | Xiao et al. |
| 2018/0287156 A1 | 10/2018 | Yu et al. |
| 2020/0118770 A1 | 4/2020 | Liu et al. |
| 2020/0395593 A1* | 12/2020 | Zhu ..................... H01M 10/058 |

OTHER PUBLICATIONS

Xiao, Xingcheng et al., U.S. Appl. No. 16/239,027, filed Jan. 3, 2019 entitled, "Method for in Situ Growth of Axial Geometry Carbon Structures in Electrodes," 38 pages.

Armstrong, A.R. et al., "Overcharging manganese oxides: Extracting lithium beyond Mn4+," Journal of Power Sources, 146 (2005), pp. 275-280; (Published Jun. 13, 2005) DOI: 10.1016/j.powsour. 2005.03.104.

Baker, Daniel R. et al., "An approach to charaterize and clarify hysteresis phenomena of lithium-silicon electrodes," Journal of Applied Physics (2017), 122, 165102; (Published Oct. 24, 2017) DOI: 10.1063/1.4995277.

Li, Yi-Xiao et al., "Synthesis and Characterization of Li2MnSiO4/C nanocomposite cathode materiasl for lithium ion batteries," Journal of Power Sources, 174 (2007), pp. 528-532; (Published Jun. 27, 2007) DOI: 10.1016/j.powsour.2007.06.126.

Sakar, Tammy et al., "Mechanism of Charge Transfer in Olivine-Type LiFESiO4 and LiFe0.5M0.5SiO4 (M=Mg or Al) Cathode Materials: First-Principles Analysis," J. Phys.Chem. C (2015), 119, pp. 9125-9133 (Published Apr. 15, 2016) DOI: 10.1021/acs.jpcc. 5b01692.

Holtstiege, Florian et al., "Pre-Lithiation Strategies for Rechargeable Energy Storage Technologies: Concepts, Promises and Challenges," Batteries (2018), 4, 4, pp. 1-39 (Published Jan. 23, 2018) DOI: 10.3390/batteries4010004.

Verbrugge, Mark et al., "Thermodynamic Model for Substitutional Materials: Application to Lithiated Graphite, Spinel Manganese Oxide, Iron Phosphate, and Layered Nickel-Manganese-Cobalt Oxide," Journal of The Electrochemical Society, 164 (11), pp. E3243-E3253; (Published May 25, 2017) DOI: 10.1149/2.0341708jes.

Xiao, Xingcheng et al., "Regulated Breathing Effect of Silicon Negative Electrode for Dramatically Enhanced Performance of Li-Ion Battery," Adv. Funct. Mater., 2015 (25) 1426, 8 pages; DOI: 10.1002/adfm.201403629.

\* cited by examiner

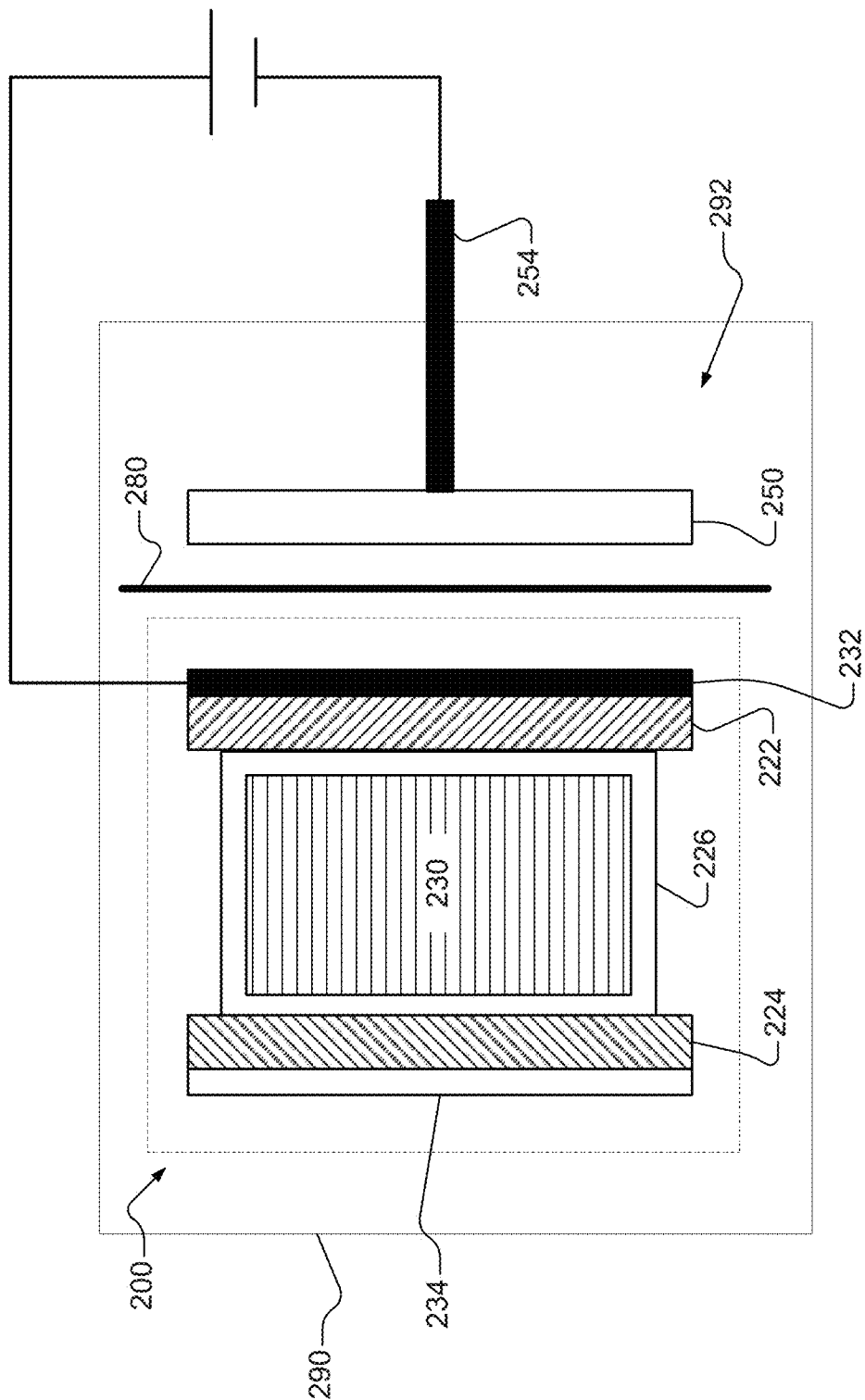

METHODS FOR PRE-LITHIATING LITHIUM ION BATTERIES

INTRODUCTION

This section provides background information related to the present disclosure which is not necessarily prior art.

The present disclosure relates to lithiated electrodes, for example pre-lithiated electrodes, electrochemical cells including lithiated electrodes, and methods of making the same.

Advanced energy storage devices and systems are in demand to satisfy energy and/or power requirements for a variety of products, including automotive products such as start-stop systems (e.g., 12V start-stop systems), battery-assisted systems, hybrid electric vehicles ("HEVs"), and electric vehicles ("EVs"). Typical lithium-ion batteries include at least two electrodes and an electrolyte and/or separator. One of the two electrodes may serve as a positive electrode or cathode and the other electrode may serve as a negative electrode or anode. A separator and/or electrolyte may be disposed between the negative and positive electrodes. The electrolyte is suitable for conducting lithium ions between the electrodes and, like the two electrodes, may be in solid and/or liquid form and/or a hybrid thereof. In instances of solid-state batteries, which include solid-state electrodes and a solid-state electrolyte, the solid-state electrolyte may physically separate the electrodes so that a distinct separator is not required.

Conventional rechargeable lithium-ion batteries operate by reversibly passing lithium ions back and forth between the negative electrode and the positive electrode. For example, lithium ions may move from the positive electrode to the negative electrode during charging of the battery, and in the opposite direction when discharging the battery. Such lithium-ion batteries can reversibly supply power to an associated load device on demand. More specifically, electrical power can be supplied to a load device by the lithium-ion battery until the lithium content of the negative electrode is effectively depleted. The battery may then be recharged by passing a suitable direct electrical current in the opposite direction between the electrodes.

During discharge, the negative electrode may contain a comparatively high concentration of intercalated lithium, which is oxidized into lithium ions and electrons. Lithium ions may travel from the negative electrode to the positive electrode, for example, through the ionically conductive electrolyte solution contained within the pores of an interposed porous separator. Concurrently, electrons pass through an external circuit from the negative electrode to the positive electrode. Such lithium ions may be assimilated into the material of the positive electrode by an electrochemical reduction reaction. The battery may be recharged or regenerated after a partial or full discharge of its available capacity by an external power source, which reverses the electrochemical reactions that transpired during discharge.

In various instances, however, a portion of the intercalated lithium remains with the negative electrode following the first cycle due to, for example, the formation of a solid electrolyte interphase (SEI) layer on the negative electrode during the first cycle, as well as ongoing lithium loss due to, for example, continuous solid electrolyte interphase breakage. Such permanent loss of lithium ions may result in a decreased specific energy and power in the battery resulting from, for example, added positive electrode mass that does not participate in the reversible operation of the battery. For example, the lithium-ion battery may experience an irreversible capacity loss of greater than or equal to about 5% to less than or equal to about 30% after the first cycle. Currently, cathode materials, such as lithium nickel cobalt manganese oxide (NCM, $LiNi_xCo_yMn_zO_2$ (where $x+y+z=1\pm0.2$), are used to compensate for first cycle lithium loss. However, such materials are often costly and, in many instances, add undesirable weight to the system. Other current methods include, for example, lithium foil lamination and/or stabilized lithium metal powder. However, such lithium foil laminations are costly, and the metal powders pose significant safety concerns. Accordingly, it would be desirable to develop improved electrodes and methods of making improved electrodes for an electrochemical cell that can address these challenges.

SUMMARY

This section provides a general summary of the disclosure, and is not a comprehensive disclosure of its full scope or all of its features.

In various aspects, the present disclosure provides a method of lithiating an electrochemical cell disposed within a battery packaging. The method includes lithiating at least one electrode in the electrochemical cell by applying current across a first current collector of the at least one electrode to a second current collector of an auxiliary electrode. The auxiliary electrode may be disposed within the battery packaging adjacent to an edge of the electrochemical cell. The at least one electrode includes a first electroactive layer disposed on or near one or more surfaces of the first current collector. The auxiliary electrode includes a second electroactive layer disposed at or near one or more surfaces of the second current collector.

In one aspect, the method may further include, after the applying of the current across the first current collector and the second current collector, dividing the packaging into first and second halves. The first half of the packaging may include the electrochemical cell including the at least one lithiated electrode. The second half of the packaging may include the auxiliary electrode.

In one aspect, the packaging is divided using a heat sealer.

In one aspect, the second current collector defines a major plane that may be substantially perpendicular to a major plane defined by the second electroactive layer such that the second current collector passes through the battery packaging and extends out of the battery packaging.

In one aspect, the second electroactive layer may include one or more laminated layers.

In one aspect, a first end of the second current collector may be disposed between first and second layers of the one or more laminated layers.

In one aspect, the second electroactive layer may include one or more electroactive materials selected from the group consisting of: silicon, silicon oxide, graphite, graphene, carbon nanotubes (CNTs), lithium titanium oxide ($Li_4Ti_5O_{12}$), vanadium oxide ($V_2O_5$), tin oxide (SnO), titanium dioxide ($TiO_2$), iron sulfide (FeS), lithium metal, and combinations thereof.

In one aspect, the second electroactive layer may include one or more electroactive materials selected from the group consisting of $LiNi_xMn_yCo_{1-x-y}O_2$ (where $0 \leq x \leq 1$ and $0 \leq y \leq 1$), $LiNi_xMn_{1-x}O_2$ (where $0 \leq x \leq 1$), $Li_{1+x}MO_2$ (where M is one of Mn, Ni, Co, and Al and $0 \leq x \leq 1$), $Li_2MnO_3$, $Li_2Mn_2O_4$, $LiNi_{0.5}Mn_{1.5}O_4$, $LiV_2(PO_4)_3$, $LiFePO_4$, $LiCoPO_4$, $LiMnPO_4$, $LiVPO_4F$, $LiFeBO_3$, $LiCoBO_3$, $LiMnBO_3$, $Li_2FeSiO_4$, $Li_2MnSiO_4$, $LiMnSiO_4F$, $LiFeSiO_4$, LiFe$_{0.5}$M$_{0.5}$SiO$_4$ (where M is one of magnesium (Mg) and aluminum (Al)), and combinations thereof.

In one aspect, the second electroactive layer may be porous. The second electroactive layer may have a porosity greater than or equal to about 10 vol. % to less than or equal to about 60 vol. %

In one aspect, the second electroactive layer includes one or more electrically conductive materials.

In one aspect, the second electroactive layer includes one or more binders selected from poly(tetrafluoroethylene) (PTFE), sodium carboxymethyl cellulose (CMC), styrene-butadiene rubber (SBR), poly(vinylidene fluoride) (PVDF), nitrile butadiene rubber (NBR), styrene ethylene butylene styrene copolymer (SEBS), styrene butadiene styrene copolymer (SBS), lithium polyacrylate (LiPAA), sodium polyacrylate (NaPAA), sodium alginate, lithium alginate, and ethylene propylene diene monomer (EPDM).

In one aspect, the current may be a constant current greater than or equal to about C/100 to less than or equal to about 1° C.

In various other aspects, the present disclosure provides another method of pre-lithiating an electrochemical cell. The electrochemical cell may include at least one electrode. The at least one electrode may include a first current collector. The method may include disposing an auxiliary electrode adjacent to an edge of the electrochemical cell. The electrochemical cell and auxiliary electrode may both be disposed within a battery packaging. The auxiliary electrode may include an electroactive layer and a second current collector extending perpendicularly from the electroactive layer. A first end of the second current collector may interface with the electroactive layer, and a second end of the second current collector may extend out of the battery packaging. The method may further include applying a current across the first current collector and the second current collector so as to pre-lithiate the at least one electrode; and extracting the auxiliary electrode from the battery packaging.

In one aspect, extracting includes concurrently dividing the battery packaging into first and second halves and heat sealing at least one of the first and second halves. The first half of the battery packaging includes the electrochemical cell including the at least one pre-lithiated electrode, and the second half of the battery packaging includes the auxiliary electrode.

In one aspect, the electroactive layer includes one or more laminated layers and each of the laminated layers includes one or more electroactive materials selected from the group consisting of: LiNi$_x$Mn$_y$Co$_{1-x-y}$O$_2$ (where 0≤x≤1 and 0≤y≤1), LiNi$_x$Mn$_{1-x}$O$_2$ (where 0≤x≤1), Li$_{1+x}$MO$_2$ (where M is one of Mn, Ni, Co, and Al and 0≤x≤1), Li$_2$MnO$_3$, LiMn$_2$O$_4$, LiNi$_{0.5}$Mn$_{1.5}$O$_4$, LiV$_2$(PO$_4$)$_3$, LiFePO$_4$, LiCoPO$_4$, LiMnPO$_4$, LiVPO$_4$F, LiFeBO$_3$, LiCoBO$_3$, LiMnBO$_3$, Li$_2$FeSiO$_4$, Li$_2$MnSiO$_4$, LiMnSiO$_4$F, LiFeSiO$_4$, LiFe$_{0.5}$M$_{0.5}$SiO$_4$ (where M is one of magnesium (Mg) and aluminum (Al)), silicon, silicon oxide, graphite, graphene, carbon nanotubes (CNTs), lithium titanium oxide (Li$_4$Ti$_5$O$_{12}$), vanadium oxide (V$_2$O$_5$), tin oxide (SnO), titanium dioxide (TiO$_2$), iron sulfide (FeS), lithium metal, and combinations thereof.

In one aspect, the electroactive layer includes one or more laminated layers and the first end of the second current collector may be disposed between first and second layers of the one or more laminated layers.

In one aspect, the electroactive layer may be porous. For example, the electroactive layer may have a porosity greater than or equal to about 10 vol. % to less than or equal to about 60 vol. %.

In one aspect, the electroactive layer may further include one or more electrically conductive materials.

In one aspect, the electroactive layer may further include one or more binders selected from poly(tetrafluoroethylene) (PTFE), sodium carboxymethyl cellulose (CMC), styrene-butadiene rubber (SBR), poly(vinylidene fluoride) (PVDF), nitrile butadiene rubber (NBR), styrene ethylene butylene styrene copolymer (SEBS), styrene butadiene styrene copolymer (SBS), lithium polyacrylate (LiPAA), sodium polyacrylate (NaPAA), sodium alginate, lithium alginate, and ethylene propylene diene monomer (EPDM).

In one aspect, the applied current may be a constant current greater than or equal to about C/100 to less than or equal to about 1° C.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 2B is schematic illustration of another system for lithiation of an electrochemical cell in accordance with various aspects of the present disclosure;

Corresponding reference numerals indicate corresponding parts throughout the several views of the drawings.

DETAILED DESCRIPTION

Figure 1:
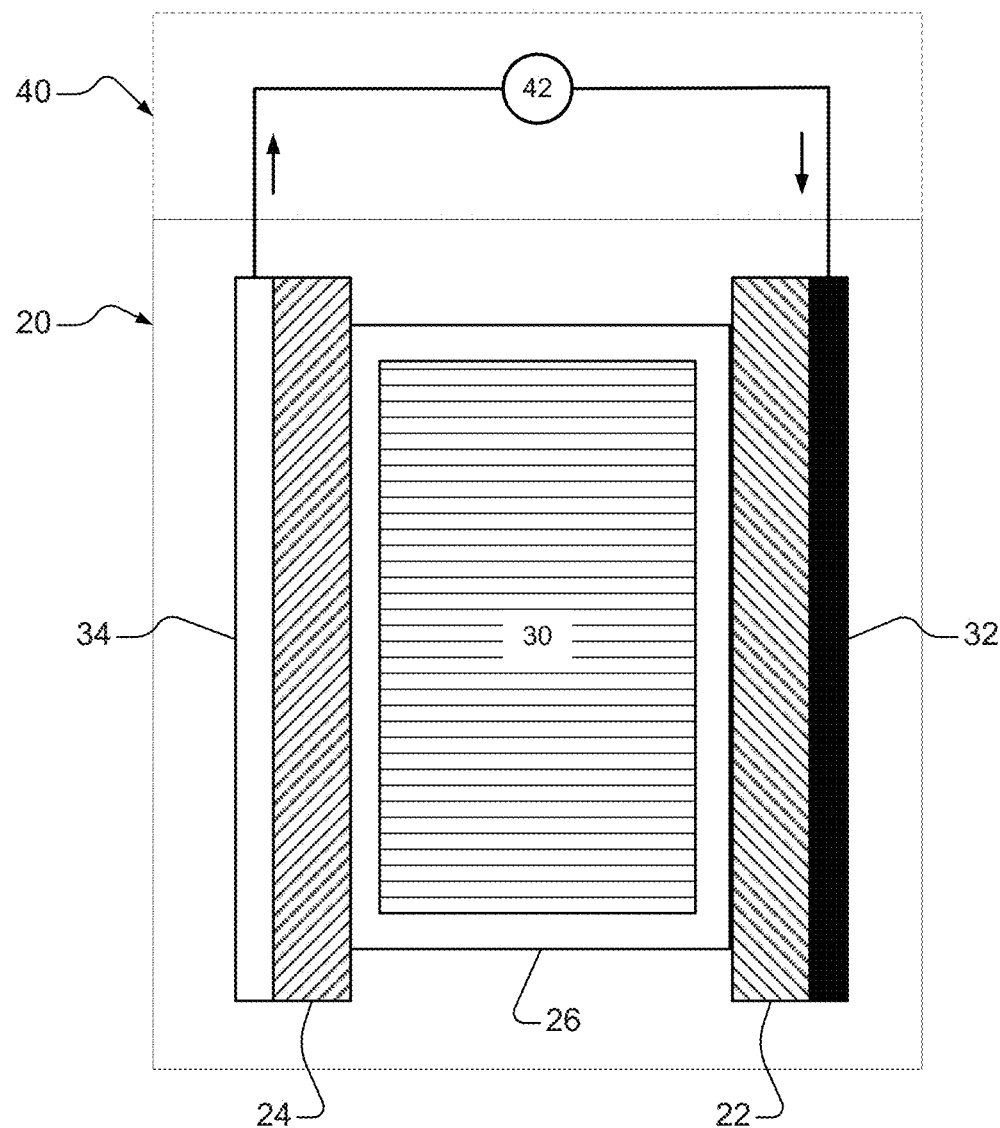
FIG. 1 is a schematic of an example electrochemical battery that cycles lithium ions.

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise.

The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers, and/or sections should not be limited by these terms, unless otherwise indicated. These terms may be only used to distinguish one step, element, component, region, layer, or section from another step, element, component, region, layer or section. Terms such as "first," "second," and other numerical terms when used herein do not imply a sequence or order unless clearly indicated by the context. Thus, a first step, element, component, region, layer, or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned, as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

The present technology relates to improved electrodes (and electrochemical cells including the improved electrodes) and methods of making the same that reduce operation inefficiencies resulting from, for example, loss of active lithium ion during the first cell cycle. In particular, the present disclosure provides methods of lithiating an electroactive material of the electrode, for example pre-lithiating an electroactive material of the electrode. Lithiation creates a lithium reservoir in the cell. The reserved lithium compensates for lithium lost during cycling, including during the first cycle, of the electrochemical cell so as to decrease capacity loss over time.

A typical lithium-ion battery includes a first electrode (such as a positive electrode or cathode) opposing a second electrode (such as a negative electrode or anode) and a separator and/or electrolyte disposed therebetween. Often, in a lithium-ion battery pack, batteries or cells may be electrically connected in a stack or winding configuration to increase overall output. Lithium-ion batteries operate by reversibly passing lithium ions between the first and second electrodes. For example, lithium ions may move from a positive electrode to a negative electrode during charging of the battery, and in the opposite direction when discharging the battery. The electrolyte is suitable for conducting lithium ions and may be in liquid, gel, or solid form. For example, an exemplary and schematic illustration of an electrochemical cell (also referred to as the battery) 20 is shown in FIG. 1. Though the illustrated examples include a single cathode and a single anode, the skilled artisan will recognize that the current teaches extend to various other configurations, including those having one or more cathodes and one or more anodes, as well as various current collectors with electroactive layers disposed on or adjacent to one or more surfaces thereof.

The battery 20 includes a negative electrode 22, a positive electrode 24, and a separator 26 disposed between the electrodes 22, 24. The separator 26 provides electrical separation-prevents physical contact-between the electrodes 22, 24. The separator 26 also provides a minimal resistance path for internal passage of lithium ions, and in certain instances, related anions, during cycling of the lithium ions. In various aspects, the separator 26 comprises an electrolyte 30 that may, in certain aspects, also be present in the negative electrode 22 and positive electrode 24. In certain variations, the separator 26 may be formed by a solid-state electrolyte 30. For example, the separator 26 may be defined by a plurality of solid-state electrolyte particles (not shown).

A negative electrode current collector 32 may be positioned at or near the negative electrode 22, and a positive electrode current collector 34 may be positioned at or near the positive electrode 24. The negative electrode current collector 32 and the positive electrode current collector 34 respectively collect and move free electrons to and from an external circuit 40. For example, an interruptible external circuit 40 and a load device 42 may connect the negative electrode 22 (through the negative electrode current collector 32) and the positive electrode 24 (through the positive electrode current collector 34). The positive electrode current collector 34 may be a metal foil, metal grid or screen, or expanded metal comprising aluminum or any other appropriate electrically conductive material known to those of skill in the art. The negative electrode current collector 32 may be a metal foil, metal grid or screen, or expanded metal comprising copper or any other appropriate electrically conductive material known to those of skill in the art.

The battery 20 may generate an electric current during discharge by way of reversible electrochemical reactions that occur when the external circuit 40 is closed (to connect the negative electrode 22 and the positive electrode 24) and the negative electrode 22 contains a relatively greater quantity of lithium than the positive electrode 24. The chemical potential difference between the positive electrode 24 and the negative electrode 22 drives electrons produced by a reaction, for example, the oxidation of intercalated lithium, at the negative electrode 22 through the external circuit 40 towards the positive electrode 24. Lithium ions, which are also produced at the negative electrode 22, are concurrently transferred through the electrolyte 30 contained in the separator 26 towards the positive electrode 24. The electrons flow through the external circuit 40 and the lithium ions migrate across the separator 26 containing the electrolyte solution 30 to form intercalated lithium at the positive electrode 24. The electric current passing through the external circuit 40 can be harnessed and directed through the load device 42 until the lithium in the negative electrode 22 is depleted and the capacity of the battery 20 is diminished.

The battery 20 can be charged or re-energized at any time by connecting an external power source to the lithium-ion battery 20 to reverse the electrochemical reactions that occur during battery discharge. Connecting an external electrical energy source to the battery 20 promotes a reaction, for example, non-spontaneous oxidation of intercalated lithium, at the negative electrode 22 so that electrons and lithium ions are produced. The electrons, which flow back towards the positive electrode 24 through the external circuit 40, and the lithium ions, which are carried by the electrolyte solution 30 across the separator 26 back towards the positive electrode 24, reunite at the positive electrode 24 and replenish it with lithium (e.g., intercalated lithium) for use during the next battery discharge event. As such, a complete discharging event followed by a complete charging event is considered to be a cycle, where lithium ions are cycled between the positive electrode 24 and the negative electrode 22. The external power source that may be used to charge the battery 20 may vary depending on the size, construction, and particular end-use of the battery 20. Some notable and exemplary external power sources include, but are not limited to, an AC-DC converter connected to an AC electrical power grid though a wall outlet and a motor vehicle alternator.

In many lithium-ion battery configurations, each of the negative electrode current collector 32, negative electrode 22, separator 26, positive electrode 24, and positive electrode current collector 34 are prepared as relatively thin layers (for example, from several microns to a fraction of a millimeter or less in thickness) and assembled in layers connected in electrical parallel arrangement to provide a suitable electrical energy and power package. In various aspects, the battery 20 may also include a variety of other components that, while not depicted here, are nonetheless known to those of skill in the art. For instance, the battery 20 may include a casing, gaskets, terminal caps, tabs, battery terminals, and any other conventional components or materials that may be situated within the battery 20, including between or around the negative electrode 22, the positive electrode 24, and/or the separator 26. The battery 20 described above includes a liquid electrolyte and shows representative concepts of battery operation. However, the battery 20 may also be a solid-state battery that includes a solid-state electrolyte that may have a different design, as known to those of skill in the art.

As noted above, the size and shape of the battery 20 may vary depending on the particular application for which it is designed. Battery-powered vehicles and hand-held consumer electronic devices, for example, are two examples where the battery 20 would most likely be designed to different size, capacity, and power-output specifications. The battery 20 may also be connected in series or parallel with other similar lithium-ion cells or batteries to produce a greater voltage output, energy, and power if it is required by the load device 42. Accordingly, the battery 20 can generate electric current to a load device 42 that is part of the external circuit 40. The load device 42 may be powered by the electric current passing through the external circuit 40 when the battery 20 is discharging. While the electrical load device 42 may be any number of known electrically-powered devices, a few specific examples include an electric motor for an electrified vehicle, a laptop computer, a tablet computer, a cellular phone, and cordless power tools or appliances. The load device 42 may also be an electricity-generating apparatus that charges the battery 20 for purposes of storing electrical energy.

With renewed reference to FIG. 1, the positive electrode 24, the negative electrode 22, and the separator 26 may each include an electrolyte solution or system 30, for example inside their pores, capable of conducting lithium ions between the negative electrode 22 and the positive electrode 24. Any appropriate electrolyte 30, whether in solid, liquid, or gel form, capable of conducting lithium ions between the electrodes 22, 24, may be used in the battery 20. For example, the electrolyte 30 may be a non-aqueous liquid electrolyte solution that includes a lithium salt dissolved in an organic solvent or a mixture of organic solvents. Numerous conventional non-aqueous liquid electrolyte solutions may be employed in the battery 20.

Appropriate lithium salts generally have inert anions. A non-limiting list of lithium salts that may be dissolved in an organic solvent or a mixture of organic solvents to form the non-aqueous liquid electrolyte solution include lithium hexafluorophosphate (LiPF$_6$); lithium perchlorate (LiClO$_4$), lithium tetrachloroaluminate (LiAlCl$_4$), lithium iodide (LiI), lithium bromide (LiBr), lithium thiocyanate (LiSCN), lithium tetrafluoroborate (LiBF$_4$), lithium difluorooxalatoborate (LiBF$_2$(C$_2$O$_4$)) (LiODFB), lithium tetraphenylborate (LiB(C$_6$H$_5$)$_4$), lithium bis-(oxalate)borate (LiB(C$_2$O$_4$)$_2$) (LiBOB), lithium tetrafluorooxalatophosphate (LiPF$_4$(C$_2$O$_4$)) (LiFOP), lithium nitrate (LiNO$_3$), lithium hexafluoroarsenate (LiAsF$_6$), lithium trifluoromethanesulfonate (LiCF$_3$SO$_3$), lithium bis(trifluoromethanesulfonimide) (LiTFSI) (LiN(CF$_3$SO$_2$)$_2$), lithium fluorosulfonylimide (LiN(FSO$_2$)$_2$) (LiFSI), and combinations thereof. In certain variations, the lithium salt is selected from lithium hexafluorophosphate (LiPF$_6$), lithium bis(trifluoromethanesulfonimide) (LiTFSI) (LiN(CF$_3$SO$_2$)$_2$), lithium fluorosulfonylimide (LiN(FSO$_2$)$_2$) (LiFSI), lithium fluoroalkylphosphate (LiFAP) (Li$_3$O$_4$P), and combinations thereof.

These and other similar lithium salts may be dissolved in a variety of organic solvents, including, but not limited to, various alkyl carbonates, such as cyclic carbonates (e.g., ethylene carbonate (EC), propylene carbonate (PC), butylene carbonate (BC), fluoroethylene carbonate (FEC)), linear carbonates (e.g., dimethyl carbonate (DMC), diethyl carbonate (DEC), ethyl methyl carbonate (EMC)), aliphatic carboxylic esters (e.g., methyl formate, methyl acetate, methyl propionate), γ-lactones (e.g., γ-butyrolactone, γ-valerolactone), chain structure ethers (e.g., 1,2-dimethoxyethane (DME), 1-2-diethoxyethane, ethoxymethoxyethane), cyclic ethers (e.g., tetrahydrofuran, 2-methyltetrahydrofuran, 1,3-dioxolane (DOL)), sulfur compounds (e.g., sulfolane), and combinations thereof. In various aspects, the electrolyte may include greater than or equal to 1M to less than or equal to about 2M concentration of the one or more lithium salts. In certain variations, for example when the electrolyte has a lithium concentration greater than about 2 M or ionic liquids, the electrolyte may include one or more diluters, such as fluoroethylene carbonate (FEC) and/or hydrofluoroether (HFE).

The solid-state electrolyte may include one or more solid-state electrolyte particles that may comprise one or more polymer-based particles, oxide-based particles, sulfide-based particles, halide-based particles, borate-based particles, nitride-based particles, and hydride-based particles. Such a solid-state electrolyte may be disposed in a plurality of layers so as to define a three-dimensional structure, and in certain aspects, the separator 26. In various aspects, the polymer-based particles may be intermingled with a lithium salt so as to act as a solid solvent.

In various aspects, the oxide-based particles may comprise one or more garnet ceramics, LISICON-type oxides, NASICON-type oxides, and Perovskite-type ceramics. For example, the one or more garnet ceramics may be selected from the group consisting of: Li$_{6.5}$La$_3$Zr$_{1.75}$Te$_{0.25}$O$_{12}$, Li$_7$La$_3$Zr$_2$O$_2$, Li$_{6.2}$Ga$_{0.3}$La$_{2.95}$Rb$_{0.05}$Zr$_2$O$_{12}$, Li$_{6.85}$La$_{2.9}$Ca$_{0.1}$Zr$_{1.75}$Nb$_{0.25}$O$_{12}$, Li$_{6.25}$Al$_{0.25}$La$_3$Zr$_2$O$_{12}$, Li$_{6.75}$La$_3$Zr$_{1.75}$Nb$_{0.25}$O$_{12}$, Li$_{6.75}$La$_3$Zr$_{1.75}$Nb$_{0.25}$O$_{12}$, and combinations thereof. The one or more LISICON-type oxides may be selected from the group consisting of: Li$_4$Zn(GeO$_4$)$_4$, Li$_{3+x}$(P$_{1-x}$Si$_x$)O$_4$ (where 0<x<1), Li$_{3+x}$Ge$_x$V$_{1-x}$O$_4$ (where 0<x<1), and combinations thereof. The one or more NASICON-type oxides may be defined by LiMM'(PO$_4$)$_3$, where M and M' are independently selected from Al, Ge, Ti, Sn, Hf, Zr, and La. For example, in certain variations, the one or more NASICON-type oxides may be selected from the group consisting of: Li$_{1+x}$Al$_x$Ge$_{2-x}$(PO$_4$)$_3$ (LAGP) (where 0≤x≤2), Li$_{1+x}$Al$_x$Ti$_{2-x}$(PO$_4$)$_3$ (LATP) (where 0≤x≤2), Li$_{1+x}$Y$_x$Zr$_{2-x}$(PO$_4$)$_3$ (LYZP) (where 0≤x≤2), Li$_{1.3}$Al$_{0.3}$Ti$_{1.7}$(PO$_4$)$_3$, LiTi$_2$(PO$_4$)$_3$, LiGeTi(PO$_4$)$_3$, LiGe$_2$(PO$_4$)$_3$, LiHf$_2$(PO$_4$)$_3$, and combinations thereof. The one or more Perovskite-type ceramics may be selected from the group consisting of: Li$_{3.3}$La$_{0.53}$TiO$_3$, LiSr$_{1.65}$Zr$_{1.3}$Ta$_{1.7}$O$_9$, Li$_{2x-y}$Sr$_{1-x}$Ta$_y$Zr$_{1-y}$O$_3$ (where x=0.75y and 0.60<y<0.75), Li$_{3/8}$Sr$_{7/16}$Nb$_{3/4}$Zr$_{1/4}$O$_3$, Li$_{3x}$La$_{(2/3-x)}$TiO$_3$ (where 0<x<0.25), and combinations thereof.

In various aspects, the polymer-based particles may comprise one or more of polymer materials selected from the group consisting of: polyethylene glycol, poly(p-phenylene oxide) (PPO), poly(methyl methacrylate) (PMMA), polyacrylonitrile (PAN), polyvinylidene fluoride (PVDF), poly(vinylidene fluoride-co-hexafluoropropylene) (PVDF-HFP), polyvinyl chloride (PVC), and combinations thereof. The sulfide-based particles may include one or more sulfide-based materials selected from the group consisting of: Li$_2$S—P$_2$S$_5$, Li$_2$S—P$_2$S$_5$-MS$_x$ (where M is Si, Ge, and Sn and 0≤x≤2), Li$_{3.4}$Si$_{0.4}$P$_{0.6}$S$_4$, Li$_{10}$GeP$_2$S$_{11.7}$O$_{0.3}$, Li$_{9.6}$P$_3$S$_{12}$, Li$_7$P$_3$S$_{11}$, Li$_9$P$_3$S$_9$O$_3$, Li$_{10.35}$Si$_{1.35}$P$_{1.65}$S$_{12}$, Li$_{9.81}$Sn$_{0.81}$P$_{2.19}$S$_{12}$, Li$_{10}$(Si$_{0.5}$Ge$_{0.5}$)P$_2$S$_{12}$, Li(Ge$_{0.5}$Sn$_{0.5}$)P$_2$S$_{12}$, Li(Si$_{0.5}$Sn$_{0.5}$)P$_5$S$_{12}$, Li$_{10}$GeP$_2$S$_{12}$ (LGPS), Li$_6$PS$_5$X (where X is Cl, Br, or I), Li$_7$P$_2$S$_8$I, Li$_{10.35}$Ge$_{1.35}$P$_{1.65}$S$_{12}$, Li$_{3.25}$Ge$_{0.25}$P$_{0.75}$S$_4$, Li$_{10}$SnP$_2$S$_{12}$, Li$_{10}$SiP$_2$S$_{12}$, Li$_{9.54}$Si$_{1.74}$P$_{1.44}$S$_{11.7}$Cl$_{0.3}$, (1-x)P$_2$S$_5$-xLi$_2$S (where 0.5≤x≤0.7), and combinations thereof. The halide-based particles may include one or more halide-based materials selected from the group consisting of: Li$_2$CdCl$_4$, Li$_2$MgCl$_4$, Li$_2$CdI$_4$, Li$_2$ZnI$_4$, Li$_3$OCl, LiI, Li$_5$ZnI$_4$, Li$_3$OCl$_{1-x}$Br$_x$ (where 0<x<1), and combinations thereof.

In various aspects, the borate-based particles may include one or more borate-based materials selected from the group consisting of: Li$_2$B$_4$O$_7$, Li$_2$O—(B$_2$O$_3$)—(P$_2$O$_5$), and combinations thereof. The nitride-based particles may include one or more nitride-based materials selected from the group consisting of: Li$_3$N, Li$_7$PN$_4$, LiSi$_2$N$_3$, LiPON, and combinations thereof. The hydride-based particles may include one or more hydride-based materials selected from the group consisting of: Li$_3$AlH$_6$, LiBH$_4$, LiBH$_4$—LiX (where X is one of Cl, Br, and I), LiNH$_2$, Li$_2$NH, LiBH$_4$—LiNH$_2$, and combinations thereof. In still further variations, the electrolyte 30 may be a quasi-solid electrolyte comprising a hybrid of the above detailed non-aqueous liquid electrolyte solution and solid-state electrolyte systems—for example including one or more ionic liquids and one or more metal oxide particles, such as aluminum oxide (Al$_2$O$_3$) and/or silicon dioxide (SiO$_2$).

In various aspects, such as when the electrolyte 30 is a non-aqueous liquid electrolyte solution, the separator 26 may be a microporous polymeric separator including, for example a polyolefin. The polyolefin may be a homopolymer (derived from a single monomer constituent) or a heteropolymer (derived from more than one monomer constituent), which may be either linear or branched. If a heteropolymer is derived from two monomer constituents, the polyolefin may assume any copolymer chain arrangement, including those of a block copolymer or a random copolymer. Similarly, if the polyolefin is a heteropolymer derived from more than two monomer constituents, it may likewise be a block copolymer or a random copolymer. In certain aspects, the polyolefin may be polyethylene (PE), polypropylene (PP), or a blend of PE and PP, or multilayered structured porous films of PE and/or PP. Commercially available polyolefin porous membranes include CEL- GARD©2500 (a monolayer polypropylene separator) and CELGARD©2320 (a trilayer polypropylene/polyethylene/polypropylene separator) available from Celgard LLC. Various other conventionally available polymers and commercial products for forming the separator 26 are contemplated, as well as the many manufacturing methods that may be employed to produce such a microporous polymer separator 26.

When the separator 26 is a microporous polymeric separator, it may be a single layer or a multi-layer laminate, which may be fabricated from either a dry or wet process. For example, in certain instances, a single layer of the polyolefin may form the entire separator 26. In other aspects, the separator 26 may be a fibrous membrane having an abundance of pores extending between the opposing surfaces and may have an average thickness of less than a millimeter, for example. As another example, however, multiple discrete layers of similar or dissimilar polyolefins may be assembled to form the microporous polymer separator 26.

The separator 26 may also comprise other polymers in addition to the polyolefin such as, but not limited to, polyethylene terephthalate (PET), polyvinylidene fluoride (PVdF), polyamide (nylons), polyurethanes, polycarbonates, polyesters, polyetheretherketones (PEEK), polyethersulfones (PES), polyimides (PI), polyamide-imides, polyethers, polyoxymethylene (e.g., acetal), polybutylene terephthalate, polyethylenenaphthenate, polybutene, polymethylpentene, polyolefin copolymers, acrylonitrile-butadiene styrene copolymers (ABS), polystyrene copolymers, polymethylmethacrylate (PMMA), polysiloxane polymers (e.g., polydimethylsiloxane (PDMS)), polybenzimidazole (PBI), polybenzoxazole (PBO), polyphenylenes, polyarylene ether ketones, polyperfluorocyclobutanes, polyvinylidene fluoride copolymers (e.g., PVdF—hexafluoropropylene or (PVdF-HFP)), and polyvinylidene fluoride terpolymers, polyvinylfluoride, liquid crystalline polymers (e.g., VECTRAN™ (Hoechst AG, Germany) and ZENITE® (DuPont, Wilmington, Del.)), polyaramides, polyphenylene oxide, cellulosic materials, meso-porous silica, or any other material suitable for creating the required porous structure. The polyolefin layer, and any other optional polymer layers, may further be included in the separator 26 as a fibrous layer to help provide the separator 26 with appropriate structural and porosity characteristics.

In certain aspects, the separator 26 may further include one or more of a ceramic coating layer and a heat-resistant material coating. The ceramic coating layer and/or the heat-resistant material coating may be disposed on one or more sides of the separator 26. The material forming the ceramic layer may be selected from the group consisting of: alumina ($Al_2O_3$), silica ($SiO_2$), titania ($TiO_2$), and combinations thereof. The heat-resistant material may be selected from the group consisting of: Nomex, Aramid, and combinations thereof.

In various aspects, the positive electrode 24 comprises a lithium-based positive electroactive material that is capable of undergoing lithium intercalation and deintercalation, alloying and dealloying, or plating and stripping, while functioning as a positive terminal of the capacitor battery 20. In various aspects, the positive electrode 24 may be defined by a plurality of electroactive material particles (not shown). Such positive electroactive material particles may be disposed in one or more layers so as to define the three-dimensional structure of the positive electrode 24. In certain variations, as noted above, the positive electrode 24 may further include the electrolyte 30, for example a plurality of electrolyte particles (not shown).

In various aspects, the positive electrode 24 may be one of a layered-oxide cathode, a spinel cathode, and a polyanion cathode. For example, layered-oxide cathodes (e.g., rock salt layered oxides) comprise one or more lithium-based positive electroactive materials selected from $LiNi_xMn_yCo_{1-x-y}O_2$ (where $0 \leq x \leq 1$ and $0 \leq y \leq 1$), $LiNi_xMn_{1-x}O_2$ (where $0 \leq x \leq 1$), $Li_{1+x}MO_2$ (where M is one of Mn, Ni, Co, and Al and $0 \leq x \leq 1$) (for example $LCoO_2$ (LCO), $LiNiO_2$, $LiMnO_2$, $LiNi_{0.5}Mn_{0.5}O_2$, NMC111, NMC523, NMC622, NMC 721, NMC811, NCA). Spinel cathodes comprise one or more lithium-based positive electroactive materials selected from $LiMn_2O_4$ and $LiNi_{0.5}Mn_{1.5}O_4$. Olivine type cathodes comprise one or more lithium-based positive electroactive material such as $LiV_2(PO_4)_3$, $LiFePO_4$, $LiCoPO_4$, and $LiMnPO_4$. Favorite type cathodes comprise, for example, $LiVPO_4F$. Borate type cathodes comprise, for example, one or more of $LiFeBO_3$, $LiCoBO_3$, and $LiMnBO_3$. Silicate type cathodes comprise, for example, $Li_2FeSiO_4$, $Li_2MnSiO_4$, and $LiMnSiO_4F$. In still further variations, the positive electrode 24 may comprise one or more other positive electroactive materials, such as one or more of dilithium (2,5-dilithiooxy) terephthalate and polyimide. In various aspects, the positive electroactive material may be optionally coated (for example by $LiNbO_3$ and/or $Al_2O_3$) and/or may be doped (for example by one or more of magnesium (Mg), aluminum (Al), and manganese (Mn)).

The positive electroactive material in the positive electrode 24 may be optionally intermingled with one or more electrically conductive materials that provide an electron conductive path and/or at least one polymeric binder material that improves the structural integrity of the positive electrode 24. For example, the positive electroactive material in the positive electrode 24 may be optionally intermingled with binders such as poly(tetrafluoroethylene) (PTFE), sodium carboxymethyl cellulose (CMC), styrene-butadiene rubber (SBR), poly(vinylidene fluoride) (PVDF), nitrile butadiene rubber (NBR), styrene ethylene butylene styrene copolymer (SEBS), styrene butadiene styrene copolymer (SBS), lithium polyacrylate (LiPAA), sodium polyacrylate (NaPAA), sodium alginate, lithium alginate, ethylene propylene diene monomer (EPDM), and combinations thereof. Electrically conductive materials may include carbon-based materials, powder nickel or other metal particles, or a conductive polymer. Carbon-based materials may include, for example, particles of carbon black, graphite, acetylene black (such as KETCHEN™ black or DENKA™ black), carbon fibers and nanotubes, graphene, and the like. Examples of a conductive polymer include polyaniline, polythiophene, polyacetylene, polypyrrole, and the like.

For example, the positive electrode 24 may include greater than or equal to about 50 wt. % to less than or equal to about 99 wt. %, and in certain aspects, optionally greater than or equal to about 50 wt. % to less than or equal to about 95 wt. %, of the positive electroactive material; greater than or equal to about 0 wt. % to less than or equal to about 30 wt. %, and in certain aspects, optionally greater than or equal to about 2 wt. % to less than or equal to about 5 wt. %, of one or more electrically conductive materials; and greater than or equal to about 0 wt. % to less than or equal to about 20 wt. %, and in certain aspects, optionally greater than or equal to about 2 wt. % to less than or equal to about 5 wt. %, of one or more binders.

In various aspects, the negative electrode 22 comprises a lithium host material that is capable of functioning as a negative terminal of a lithium-ion battery. For example, the negative electrode 22 may comprise a lithium host material (e.g., negative electroactive material) that is capable of functioning as a negative terminal of the battery 20. In various aspects, the negative electrode 22 may be defined by a plurality of negative electroactive material particles (not shown). Such negative electroactive material particles may be disposed in one or more layers so as to define the three-dimensional structure of the negative electrode 22. In certain variations, as noted above, the negative electrode 22 may further include the electrolyte 30, for example a plurality of electrolyte particles (not shown).

The negative electrode 22 may be a negative electroactive material that is lithium based comprising, for example, a lithium metal and/or lithium alloy. In other variations, the negative electrode 22 may be a negative electroactive material that is silicon based comprising silicon, for example, a silicon alloy, silicon oxide, or combinations thereof that may be further mixed, in certain instances, with graphite. In still other variations, the negative electrode 22 may be a negative electroactive material that is a carbonaceous anode comprising, for example, one or more negative electroactive materials such as graphite, graphene, and/or carbon nanotubes (CNTs). In still further variations, the negative electrode 22 may comprise one or more lithium-accepting negative electroactive materials such as lithium titanium oxide ($Li_4Ti_5O_{12}$), one or more transition metals (such as tin (Sn)), one or more metal oxides (such as vanadium oxide ($V_2O_5$), tin oxide (SnO), titanium dioxide ($TiO_2$)), titanium niobium oxide ($Ti_xNb_yO_z$, where $0 \leq x \leq 2$, $0 \leq y \leq 24$, and $0 \leq z \leq 64$), and one or more metal sulfides (such as ferrous or iron sulfide (FeS)).

In various aspects, the negative electroactive material in the negative electrode 22 may be optionally intermingled with one or more electrically conductive materials that provide an electron conductive path and/or at least one polymeric binder material that improves the structural integrity of the negative electrode 22. For example, the negative electroactive material in the negative electrode 22 may be optionally intermingled with binders such as poly(tetrafluoroethylene) (PTFE), sodium carboxymethyl cellulose (CMC), styrene-butadiene rubber (SBR), poly(vinylidene fluoride) (PVDF), nitrile butadiene rubber (NBR), styrene ethylene butylene styrene copolymer (SEBS), styrene butadiene styrene copolymer (SBS), lithium polyacrylate (LiPAA), sodium polyacrylate (NaPAA), sodium alginate, lithium alginate, ethylene propylene diene monomer (EPDM), and combinations thereof. Electrically conductive materials may include carbon-based materials, powder nickel or other metal particles, or a conductive polymer. Carbon-based materials may include, for example, particles of carbon black, graphite, acetylene black (such as KETCHEN™ black or DENKA™ black), carbon fibers and nanotubes, graphene, and the like. Examples of a conductive polymer include polyaniline, polythiophene, polyacetylene, polypyrrole, and the like.

For example, the negative electrode 22 may include greater than or equal to about 50 wt. % to less than or equal to about 99 wt. %, and in certain aspects, optionally greater than or equal to about 50 wt. % to less than or equal to about 95 wt. %, of the negative electroactive material; greater than or equal to about 0 wt. % to less than or equal to about 30 wt. %, and in certain aspects, optionally greater than or equal to about 5 wt. % to less than or equal to about 20 wt. %, of one or more electrically conductive materials; and greater than or equal to about 0 wt. % to less than or equal to about 20 wt. %, and in certain aspects, optionally greater than or equal to about 5 wt. % to less than or equal to about 15 wt. %, of one or more binders.

As further detailed above, during discharge, the negative electrode 22 may contain a comparatively high concentration of intercalated lithium, which is oxidized into lithium ions and electrons. Lithium ions may travel from the negative electrode 22 to the positive electrode 24, for example, through the ionically conductive electrolyte 30 contained within the pores of an interposed porous separator 26. Concurrently, electrons pass through an external circuit 40 from the negative electrode 22 to the positive electrode 24. Such lithium ions may be assimilated into the material of the positive electrode 22 by an electrochemical reduction reaction. The battery may be recharged or regenerated after a partial or full discharge of its available capacity by an external power source, which reverses the electrochemical reactions that transpired during discharge.

In various instances, however, especially in instances of electrochemical cells including silicon, a portion of the intercalated lithium remains with the negative electrode 22 following a first cycle, for example, due to, for example, the formation of a solid electrolyte interphase (SEI) layer (not shown) on the negative electrode 22 during the first cycle, as well as, for example, ongoing lithium loss due to continuous solid electrolyte interphase breakage. For example, electrochemical cells including negative electrodes comprising silicon may experience a first cycle capacity loss of about 20%, and in certain aspects, about 40%. Likewise, electrochemical cells including negative electrodes comprising silicon oxides ($SiO_x$) may experience a first cycle capacity loss of about 40%. Such first cycle capacity losses create situations of low energy densities. This permanent loss of lithium ions may result in a decreased specific energy and power in the battery 20 resulting from, for example, added positive electrode mass that does not participate in the reversible operation of the battery.

In various aspects, the present disclosure provides a method for lithiating an electrochemical cell, for example the battery 20 illustrated in FIG. 1, so as to create a lithium reservoir. The reserved lithium compensates for lithium lost during cycling, including during the first cycle, of the electrochemical cell so as to decrease capacity loss over time. The method may be an in-situ method comprising lithiating at least one electrode in an electrochemical cell by applying current across a first current collector of the at least one electrode to a second current collector of an auxiliary electrode. For example, the method may include disposing an auxiliary electrode adjacent to the electrochemical cell; applying a current across an auxiliary current collector and a current collector embedded in the electrochemical cell; and extracting or removing the auxiliary electrode and current collector. In this fashion, lithiation may occur simultaneously with known aging processes.

In the instance of winding electrodes, an auxiliary electrode may in certain variations be disposed at or near terminal edge of the electrodes. For example, the auxiliary electrode may define a major plane that is situated in an orthogonal or perpendicular orientation with respect to the axis of winding. In such instances, an auxiliary current collector may have a major plane that is parallel with the axis of winding. In various other aspects, the auxiliary electrode may define a major plane that is parallel with the axis of winding, and the auxiliary current collector may have a major plane that is orthogonal or perpendicular with the axis or winding.

Figure 2A:
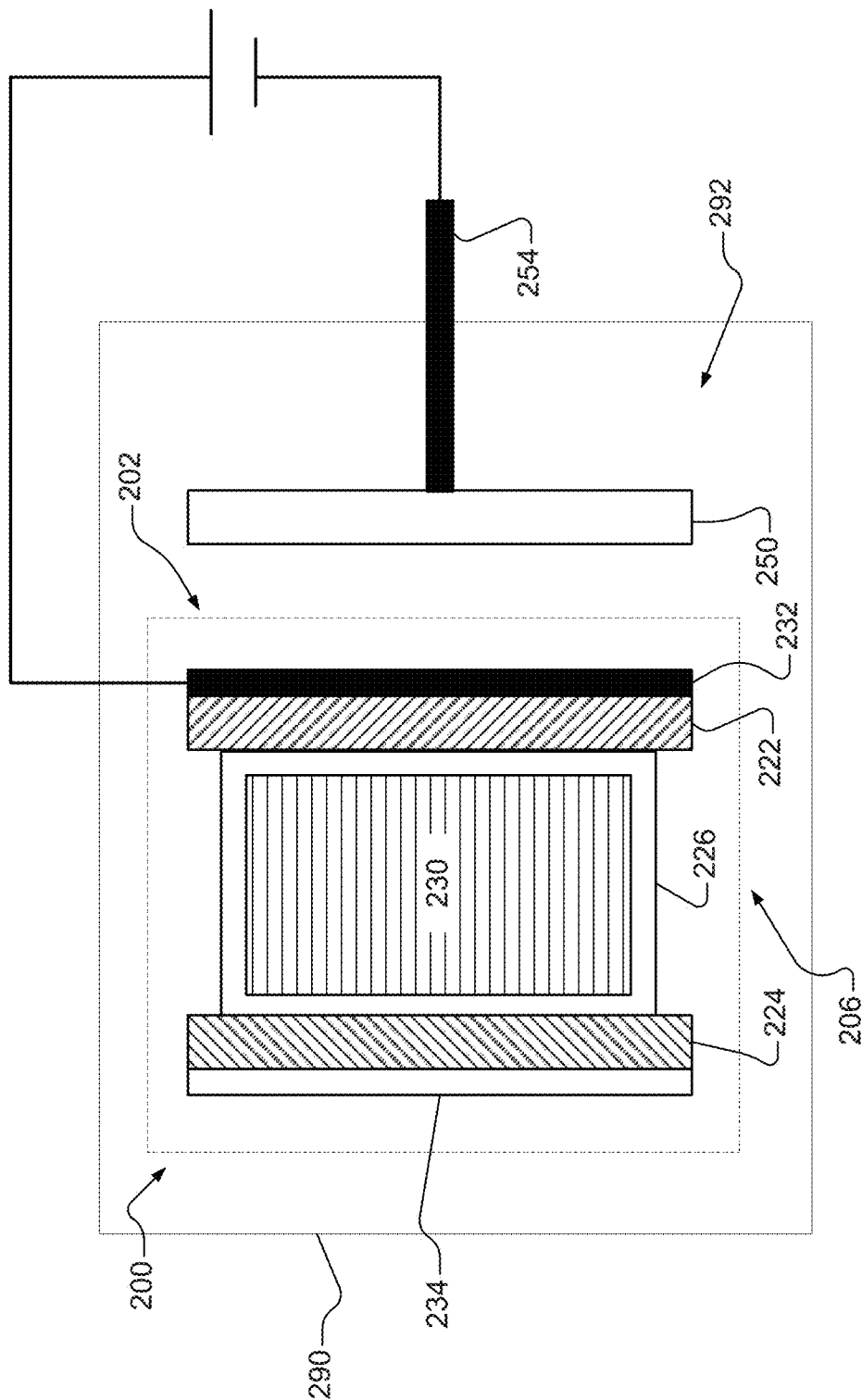
FIG. 2A is a schematic illustration of a system for lithiation of an electrochemical cell in accordance with various aspects of the present disclosure.

In the instance of electrochemical cell having a plurality of stacked electrodes, an auxiliary electrode may be placed at or near one or more edges of the electrochemical cell. For example, as illustrated in FIG. 2A, an auxiliary electrode 250 may be aligned with an edge 202 of the electrochemical cell 200. The auxiliary electrode 250 and the electrochemical cell 200 may disposed within a battery packaging 290. In various aspects, the auxiliary electrode 250 may disposed in a packaged area reserved for gas generation during formation cycles. For example, in certain variations, as illustrated, the auxiliary electrode 250 may be disposed near or adjacent to an edge 202 of the electrochemical cell 200 that is parallel with a major plane defined by the electrodes 224, 222. In such instances, an auxiliary current collector 254 may define a major plane that is situated in an orthogonal or perpendicular orientation with respect to orientation of the electrodes 222, 224. The skilled artisan will appreciate that in various other aspects, though not illustrated, an auxiliary electrode may be disposed along other edges of the electrochemical cell, such as edge 206 of the electrochemical cell 200 that is orthogonal or perpendicular to a major plane defined by the electrodes 221,224, by way of non-limiting example.

The electrochemical cell 200 as illustrated in FIG. 2A, similar to battery 20 illustrated in FIG. 1, comprises substantially parallel negative and positive electrodes 222, 224. The negative electrode 222 may be disposed on or adjacent one or more surfaces of a negative electrode current collector 232. The positive electrode 224 may be disposed on or adjacent to one or more surfaces of a positive electrode current collector 234. A separator 226 is disposed between the electrodes 222, 224 and may, in certain instances, comprises an electrolyte 230. The electrolyte 230 may also be present in one or both of the negative and positive electrodes 222, 224. As will be appreciated by those of skill in the art, the separator 226 may instead be omitted and the electrochemical cell 200 may just comprise a solid-state electrolyte, as described above.

The auxiliary electrode 250 comprises one or more electroactive materials, for example, any known positive electroactive materials and/or negative electroactive materials. For example, in various aspects, the auxiliary electrode 250 may be one of a layered-oxide cathode, a spinel cathode, and a polyanion cathode. Layered-oxide cathodes (e.g., rock salt layered oxides) comprise one or more lithium-based positive electroactive materials selected from $LiNi_xMn_yCo_{1-x-y}O_2$ (where $0 \le x \le 1$ and $0 \le y \le 1$), $LiNi_xMn_{1-x}O_2$ (where $0 \le x \le 1$), $Li_{1+x}MO_2$ (where M is one of Mn, Ni, Co, and Al and $0 \le x \le 1$) (for example $LCoO_2$ (LCO), $LiNiO_2$, $LiMnO_2$, $LiNi_{0.5}Mn_{0.5}O_2$, NMC111, NMC523, NMC622, NMC 721, NMC811, NCA). Spinel cathodes comprise one or more lithium-based positive electroactive materials selected from $LiMn_2O_4$ and $LiNi_{0.5}Mn_{1.5}O_4$. Olivine type cathodes comprise one or more lithium-based positive electroactive material such as $LiV_2(PO_4)_3$, $LiFePO_4$, $LiCoPO_4$, and $LiMnPO_4$. Favorite type cathodes comprise, for example, $LiVPO_4F$. Borate type cathodes comprise, for example, one or more of $LiFeBO_3$, $LiCoBO_3$, and $LiMnBO_3$. Silicate type cathodes comprise, for example, $Li_2FeSiO_4$, $Li_2MnSiO_4$, and $LiMnSiO_4F$. In still further variations, the auxiliary electrode 250 may comprise one or more other positive electroactive materials, such as one or more of dilithium (2,5-dilithiooxy)terephthalate and polyimide.

In various other aspects, the auxiliary electrode 250 may comprise one or more lithium-based negative electroactive materials, for example, a lithium metal and/or lithium alloy. In other variations, the auxiliary electrode 250 may comprise one or more silicon-based negative electroactive materials, for example, a silicon alloy, silicon oxide, or combinations thereof that may be further mixed, in certain instances, with graphite. In still other variations, the auxiliary electrode 250 may comprise one or more carbonaceous-based negative electroactive materials such as graphite, graphene, and/or carbon nanotubes (CNTs). In still further variations, the auxiliary electrode 250 may comprise one or more lithium-accepting negative electroactive materials such as lithium titanium oxide ($Li_4Ti_5O_{12}$), one or more transition metals (such as tin (Sn)), one or more metal oxides (such as vanadium oxide ($V_2O_5$), tin oxide (SnO), titanium dioxide ($TiO_2$)), titanium niobium oxide ($Ti_xNb_yO$, where $0 \le x \le 2$, $0 \le y \le 24$, and $0 \le z \le 64$), and one or more metal sulfides (such as ferrous or iron sulfide (FeS)).

The auxiliary electrode 250 may comprise one or more electroactive materials selected from the group consisting of $LiNi_xMn_yCo_{1-x-y}O_2$ (where $0 \le x \le 1$ and $0 \le y \le 1$), $LiNi_xMn_{1-x}O_2$ (where $0 \le x \le 1$), $Li_{1+x}MO_2$ (where M is one of Mn, Ni, Co, and Al and $0 \le x \le 1$), $Li_2MnO_3$, $LiMn_2O_4$, $LiNi_{0.5}Mn_{1.5}O_4$, $LiV_2(PO_4)_3$, $LiFePO_4$, $LiCoPO_4$, $LiMnPO_4$, $LiVPO_4F$, $LiFeBO_3$, $LiCoBO_3$, $LiMnBO_3$, $Li_2FeSiO_4$, $Li_2MnSiO_4$, $LiMnSiO_4F$, $LiFeSiO_4$, $LiFe_{0.5}M_{0.5}SiO_4$ (where M is one of magnesium (Mg) and aluminum (Al)), silicon, silicon oxide, graphite, graphene, carbon nanotubes (CNTs), lithium titanium oxide ($Li_4Ti_5O_{12}$), vanadium oxide ($V_2O_5$), tin oxide (SnO), titanium dioxide ($TiO_2$), iron sulfide (FeS), lithium metal, and combinations thereof. In certain variations, the one or more electroactive materials may be selected from the group consisting of: lithium metal, $Li_2MnO_3$, $LiFeSiO_4$, $LiFe_{0.5}M_{0.5}SiO_4$ (where M is one of magnesium (Mg) and aluminum (Al)), $LMPO_4$ (where M is one of iron (Fe) and manganese (Mn)), and combinations thereof.

In certain variations, the auxiliary electrode 250 may further comprise one or more electrically conductive materials and/or at least one polymeric binder material, similar to the electrodes 22, 24 illustrated in FIG. 1. For example, the auxiliary electrode 250 may comprise greater than 0 wt. % to less than or equal to about 100 wt. %, and in certain aspects, optionally about 88 wt. %, of the one or more electroactive materials; greater than or equal to about 0 wt. % to less than or equal to about 50 wt. % and in certain aspects, optionally about 4 wt. %, of the one or more binders; and greater than or equal to about 0 wt. % to less than or equal to about 50 wt. % and in certain aspects, optionally about 8 wt. %, of the one or more electrically conductive materials.

Figure 3:
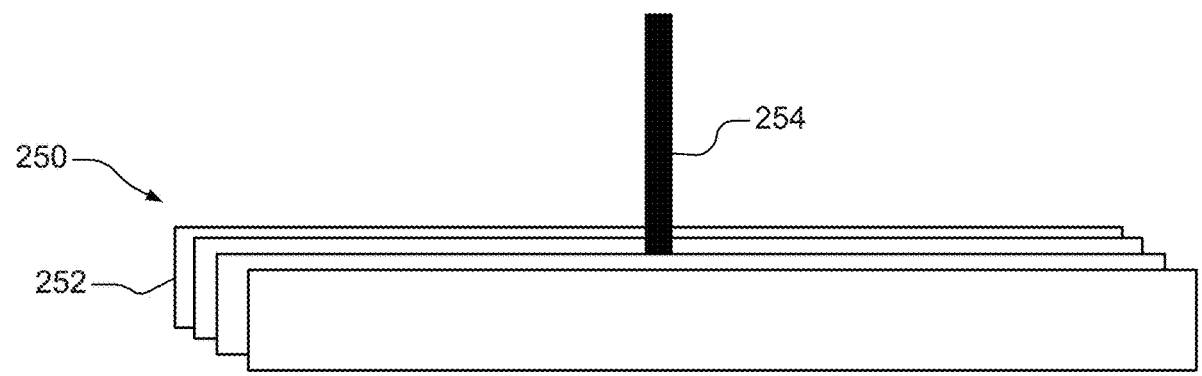
FIG. 3 is an example auxiliary electrode in accordance with certain aspects of the present disclosure.

In various aspects, the auxiliary electrode 250 may be porous. For example, the auxiliary electrode 250 may have a porosity greater than or equal to about 10 vol. % to less than or equal to about 60 vol. %. Such porosity may promote lithium ion conductivity by increasing, for example, the C-rate required for lithiation. Further, in certain instances, such porosity may improve the wettability of the electrolyte in the electrochemical cell 200. In still further variations, as best seen in FIG. 3, the auxiliary electrode 250 comprises one or more laminations or laminated films or layers 252. For example, in certain variations, the auxiliary electrode 250 comprises a number of laminations, layers or films greater than or equal to about 1 to less than or equal to about 100, and in certain aspects, optionally greater than or equal to about 1 to less than or equal to about 10. Such laminations or laminated films or layers 252 may increase the total lithiation capacity, with each layer adding additional lithiation capacity.

An auxiliary current collector 254 is coupled to the auxiliary electrode 250. As illustrated, in various aspects, the auxiliary current collector 254 may define a major plane that is situated in an orthogonal or perpendicular orientation with respect to a major plane of the auxiliary electrode 250. For example, when the auxiliary electrode 250 comprises one or more laminations or laminated films or layers 252, as illustrated in FIG. 3, the auxiliary current collector 254 may be disposed or sandwiched between select laminations or layers of the one or more lamination or laminated films or layers 252. That is, the auxiliary electrode 250 may be laminated on one or more surfaces of the auxiliary current collector 254. In various aspects, the auxiliary current collector 254 comprises a metal foil, metal grid or screen, or expanded metal comprising aluminum, copper, or any other appropriate electrically conductive material known to those of skill in the art.

With renewed reference to FIG. 2A, in various aspects, the electrochemical cell 200, as well as the auxiliary electrode 250, may be disposed within a packaging, pouch or foil 290. In particular, the auxiliary electrode 250 may be disposed in a package space 292 that is typically reserved for excess gases that may be generated during a formation cycle. The auxiliary current collector 254 coupled to the auxiliary electrode 250 passes through and extends from an interior to an exterior of the packaging 290. A current may be applied between the auxiliary electrode 250 and the negative electrode current collector 232. Such an application of current may charge the electrochemical cell 200, in particular, for example, the negative electrode 222, with excess lithium, creating a lithium reservoir therein. Such a lithium reservoir may compensate for lithium consumption during operation of the electrochemical cell 200, for example first cycle capacity lithium loss. The lithium reservoir may be established prior to or after an initial formation cycle.

In various aspects, the applied current is greater than or equal to about C/100 to less than or equal to about 1° C., greater than or equal to about C/20 to less than or equal to about 1 C, and in certain aspects, optionally greater than or equal to about C/10 to less than or equal to about C/3. The current may be applied until a known first cycle capacity loss has been compensated.

In certain aspects, as illustrated in FIG. 2B an ion-exchange membrane 280 may be disposed between the electrochemical cell 200 and the auxiliary electrode 250 such that certain metal ions, for example, having valence higher than +1 (such as $Mn^{2+}$, $Mn^{3+}$, $Fe^{2+}$, and $Fe^{3+}$) are not transported from the auxiliary electrode 250 to the electrochemical cell 200 during the application of the current.

Figure 2C:
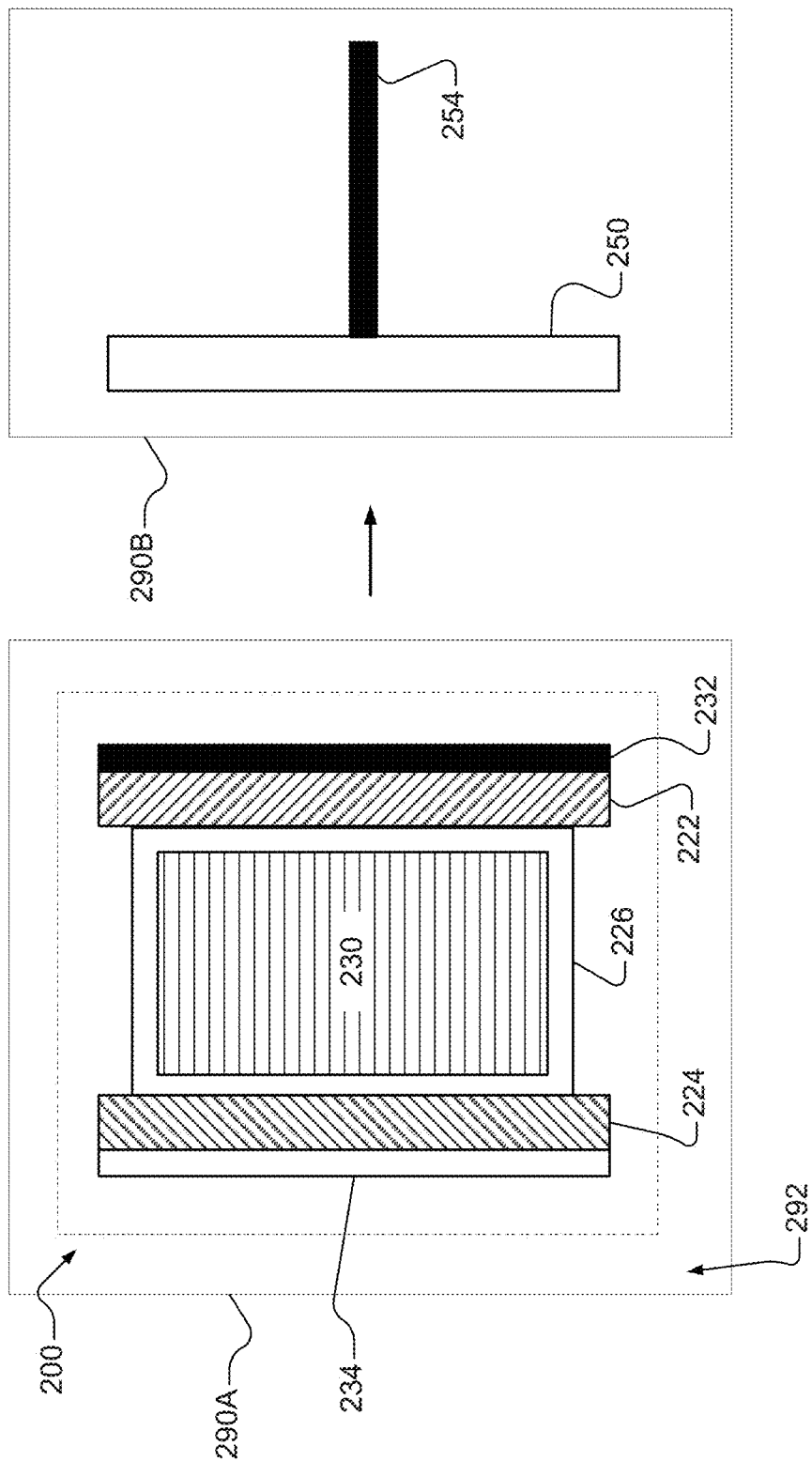
FIG. 2C is a schematic illustration of the divide or separation of an auxiliary electrode used for lithiation and a lithiated electrochemical cell in accordance with various aspects of the present disclosure.

As illustrated in FIG. 2C, following the lithiation of the electrochemical cell 200, during, for example, a gas release process commonly used to remove gas (such as $H_2$, CO, $CO_2$, and $CH_4$) generated during formation of the electrochemical cell 200, the electrochemical cell 200 and the auxiliary electrode 250 may be separated. For example, following the lithiation of the electrochemical cell 200, the packaging or pouch 290 may be divided so as to create a first package or pouch 290A comprising the electrochemical cell 200 and a second package or pouch 290B comprising the auxiliary electrode 250. For example, the packaging 290 may be divided by using a heat sealer and optional cutter such that at least one of the first and second packages 290A, 290B is sealed and may be cut to be detached from one another. In various aspects, the auxiliary electrode 250 may be recycled and used to lithiate other electrochemical cells.

In various aspects, the present disclosure provides a method for determining appropriate lithium levels for a balanced cell. The method may include cycling an electrochemical cell, for example battery 20 illustrated in FIG. 1. At the start of a first charge, the positive electrode may be fully lithiated. For example, the initial concentration of lithium at the positive electrode ($Q_{po}$) may be represented by:

$$Q_{po} = m_p q_{po}$$

where $m_p$ is the mass (g/cm$^2$) of the positive electroactive materials and $q_{po}$ is initial specific capacity (mAh/g) of the positive electroactive materials. During the first charge, all of the lithium moves out of the positive electrode. However, only a part of the displaced lithium intercalates into the negative electrode because of, for example, the formation of a solid electrolyte interphase (SEI) layer and other electrolyte reactions. The concentration (mAh/cm$^2$) of lithium at the negative electrode ($Q_n$) may be represented by:

$$Q_n = m_n q_n$$

where $m_n$ is the mass (g/cm$^2$) of the negative electroactive materials and $q_n$ is initial specific capacity (mAh/g) of the negative electroactive materials. The first cycle or irreversible capacity loss (IRCL) may be represented by:

$$IRCL = m_n q_n (1 - \eta_n)$$

where ($\eta_n$) is the first-cycle efficiency of the negative electrode.

In various aspects, as highlighted above, lithiation of the negative electrode may compensate for such first cycle capacity losses. $Q_{PLi}$ represents the amount (mAh/cm$^2$) of lithiated lithium, while $\eta_{PLi}$ represents a degree of lithiation. For example, $\eta_{PLi}$ may be defined by:

$$\eta_{PLi} = \frac{Q_{PLi}}{IRCL} = \frac{Q_{PLi}}{m_n q_n (1 - \eta_n)}$$

The cyclable lithium ($Q_{Li}$), including lithium intercalated into the negative electrode at the end of the first charge, may be represented as:

$$Q_{Li} = m_p q_{po} - m_n q_n (1 - \eta_n) + \eta_{PLi} m_n q_n (1 - \eta_n) = m_p q_{po} - m_n q_n (1 - \eta_n)(1 - \eta_{PLi}) = m_p q_{po} [1 - NP_1 (1 - \eta_n)(1 - \eta_{PLi})]$$

where $NP_1$ is the N-to-P ratio based on the first cycle capacities, for example as represented by:

$$NP_1 = \frac{m_n q_n}{m_p q_{po}}$$

In this fashion, the cyclable lithium ($Q_L$) may be generally detailed as the difference between the concentration of lithium at the positive electrode ($Q_{po}$) and the first cycle or irreversible capacity loss (IRCL) together with the lithiated lithium ($Q_{PLi}$). The maximum possible lithiation of the negative electrode ($x_{max}$) may be represented by:

$$x_{max} = \frac{Q_{Li}}{m_n q_n} = \frac{m_p q_{po} - m_n q_n (1 - \eta_n)(1 - \eta_{PLi})}{m_n q_n} = \frac{1}{NP_1} - (1 - \eta_n)(1 - \eta_{PLi})$$

Following the first discharge, as a result of the first cycle capacity loss, active sites of the positive electrode are lost.

For example, the first cycle efficiency of the positive electrode ($\eta_p$) may be represented by:

$$\eta_p = \frac{q_{pr}}{q_{po}}$$

where $q_{pr}$ is the reversible specific capacity of the positive electrode and $q_{po}$ is initial specific capacity of the positive electroactive materials as noted above.

The reversible capacity ($Q_{pr}$) of the positive electrode may be represented by:

$$Q_{pr} = m_p q_{pr} = \eta_p m_p q_{po}$$

when the positive electrode has sufficient capacity for cyclable lithium, $Q_{pr} \geq Q_{Li}$. The negative electrode maintains substantially the same number of active sites. The reversible capacity of the negative electrode is the same as the initial capacity of the negative electrode. As such, the reversible capacity of the electrochemical cell ($Q_r$) may be represented by:

$$Q_r = Q_{Li} = Z m_p q_{pr}$$

$$\text{where } Z = \frac{1 - NP_1(1-\eta_n)(1-\eta_{PLi})}{\eta_p}.$$

In such instances, the maximum lithium occupancy at the positive electrode ($y_{max}$) may be represented as $$y_{max} = \frac{Q_{Li}}{Q_{pr}} = Z$$

If the positive electrode does not have sufficient capacity for cyclable lithium ($Q_{pr} < Q_{Li}$ and $Z > 1$), the reversible cell capacity may be represented by:

$$Q_r = Q_{pr} = \eta_p m_p q_{po}$$

and the maximum lithium occupancy at the positive electrode may be 1 ($y_{max} = 1$). In such instances, the residual lithium may be represented by $$\Delta Q = Q_{Li} - Q_{pr} = m_p q_{po}[1 - NP_1(1-\eta_n)(1-\eta_{PLi})] - \eta_p m_p q_{po} =$$
$$m_p q_{po}[1 - NP_1(1-\eta_n)(1-\eta_{PLi}) - \eta_p]$$

The residual lithium cannot be deintercalated from the negative electrode, as such the minimum lithium occupancy ($x_{min}$) may be represented by:

$$x_{min} = \frac{\Delta Q}{Q_n} = \frac{m_p q_{po}[1 - NP_1(1-\eta_n)(1-\eta_{PLi}) - \eta_p]}{m_n q_n}$$

or $$x_{max} = \frac{1}{NP_1} - (1-\eta_n)(1-\eta_{PLi}) = \frac{1}{NP_r}\left[\frac{1}{\eta_p} - NP_r(1-\eta_n)(1-\eta_{PLi})\right]$$

Considering charge, Q is the amount of lithium moved out of positive electrode, such that $$m_p q_{pr} y = m_p q_{pr} y_i - Q$$

and $$m_n q_n x = m_n q_n x_i + Q$$

From which it can be determined that:

$$x = x_i + \frac{1}{NP_r}(y_i - y)$$

and $$y = y_i - NP_r(x - x_i)$$

At the start of discharge:

$$x_i = x_{max} = \frac{Z}{NP_r}$$

and $$y_i = y_{min} = 0$$

such that $$y = NP_r\left[\frac{Z}{NP_r} - x\right] = Z - NP_r x$$

The following summarizes the detailed processes for determining appropriate lithium levels for a balanced cell:

| Z | $\left[\frac{1}{\eta_p} - NP_r(1-\eta_n)(1-\eta_{PLi})\right]$ or $\left[\frac{1}{\eta_p} - \frac{NP_1}{\eta_p}(1-\eta_n)(1-\eta_{PLi})\right]$ | |
|---|---|---|
| Z | ≤1 (negative limited, enough capacity at the positive) | >1 (positive limited) |
| $x_{min}$ | 0 | $\frac{Z-1}{NP_r}$ |
| $x_{max}$ | $\frac{Z}{NP_r}$ | $\frac{Z}{NP_r}$ |
| $y_{min}$ | 0 | 0 |
| $y_{max}$ | Z | 1 |
| $Q_r$ | $Z m_p q_{pr}$ | $m_p q_{pr}$ |
|  | $\frac{Z}{NP_r} m_n q_n$ | $\frac{1}{NP_r} m_n q_n$ |
| $Q_{PLi}$ Stoichiometry | $\eta_{PLi} m_n q_n (1-\eta_n)$ $y = Z - NP_r x$ | $\eta_{PLi} m_n q_n (1-\eta_n)$ |

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of lithiating an electrochemical cell disposed within a battery packaging, the method comprising:
   lithiating at least one electrode in the electrochemical cell by applying current across a first current collector of the at least one electrode to a second current collector of an auxiliary electrode, wherein the auxiliary electrode is disposed within the battery packaging adjacent to an edge of the electrochemical cell, the at least one electrode comprises a first electroactive layer disposed on or near one or more surfaces of the first current collector, and the auxiliary electrode comprises a second electroactive layer disposed at or near one or more surfaces of the second current collector; and
   after the applying of the current across the first current collector and the second current collector, dividing the packaging into first and second halves, where the first half includes the electrochemical cell including the at least one lithiated electrode and the second half includes the auxiliary electrode.

2. The method of claim 1, wherein the packaging is divided by using a heat sealer.

3. The method of claim 1, wherein the second current collector defines a major plane that is substantially perpendicular to a major plane defined by the second electroactive layer and the second current collector passes through the battery packaging and extends out of the battery packaging.

4. The method of claim 3, wherein the second electroactive layer comprises one or more laminated layers.

5. The method of claim 4, wherein a first end of the second current collector is disposed between first and second layers of the one or more laminated layers.

6. The method of claim 1, wherein the second electroactive layer comprises one or more electroactive materials selected from the group consisting of: silicon, silicon oxide, graphite, graphene, carbon nanotubes (CNTs), lithium titanium oxide ($Li_4Ti_5O_{12}$), vanadium oxide ($V_2O_5$), tin oxide (SnO), titanium dioxide ($TiO_2$), iron sulfide (FeS), lithium metal, and combinations thereof.

7. The method of claim 1, wherein the second electroactive layer comprises one or more electroactive materials selected from the group consisting of: $LiNi_xMn_yCo_{1-x-y}O_2$ (where $0 \le x \le 1$ and $0 \le y \le 1$), $LiNi_xMn_{1-x}O_2$ (where $0 \le x \le 1$), $Li_{1+x}MO_2$ (where M is one of Mn, Ni, Co, and Al and $0 \le x \le 1$), $Li_2MnO_3$, $LiMn_2O_4$, $LiNi_{0.5}Mn_{1.5}O_4$, $LiV_2(PO_4)_3$, $LiFePO_4$, $LiCoPO_4$, $LiMnPO_4$, $LiVPO_4F$, $LiFeBO_3$, $LiCoBO_3$, $LiMnBO_3$, $Li_2FeSiO_4$, $Li_2MnSiO_4$, $LiMnSiO_4F$, $LiFeSiO_4$, $LiFe_{0.5}M_{0.5}SiO_4$ (where M is one of magnesium (Mg) and aluminum (Al)), and combinations thereof.

8. The method of claim 1, wherein the second electroactive layer is porous and has a porosity greater than or equal to about 10 vol. % to less than or equal to about 60 vol. %.

9. The method of claim 1, wherein the second electroactive layer comprises one or more electrically conductive materials.

10. The method of claim 1, wherein the second electroactive layer comprises one or more binders selected from poly(tetrafluoroethylene) (PTFE), sodium carboxymethyl cellulose (CMC), styrene-butadiene rubber (SBR), poly(vinylidene fluoride) (PVDF), nitrile butadiene rubber (NBR), styrene ethylene butylene styrene copolymer (SEBS), styrene butadiene styrene copolymer (SBS), lithium polyacrylate (LiPAA), sodium polyacrylate (NaPAA), sodium alginate, lithium alginate, and ethylene propylene diene monomer (EPDM).

11. The method of claim 1, wherein the current is a constant current greater than or equal to about C/100 to less than or equal to about 10C.

12. A method of pre-lithiating an electrochemical cell including at least one electrode comprising a first current collector, the method comprises:
   disposing within a battery packaging an auxiliary electrode adjacent to an edge of the electrochemical cell, wherein the auxiliary electrode comprises an electroactive layer and a second current collector extending perpendicularly from the electroactive layer, wherein a first end of the second current collector interfaces with the electroactive layer and a second end of the second current collector extends out of the battery packaging;
   applying a current across the first current collector and the second current collector so as to pre-lithiate the at least one electrode; and
   extracting the auxiliary electrode from the battery packaging.

13. The method of claim 12, wherein extracting includes concurrently dividing the battery packaging into first and second halves and heat sealing at least one of the first and second halves, wherein the first half of the battery packaging includes the electrochemical cell including the at least one pre-lithiated electrode and the second half of the battery packaging includes the auxiliary electrode.

14. The method of claim 12, wherein the electroactive layer comprises one or more laminated layers, wherein each of the laminated layer comprises one or more electroactive materials selected from the group consisting of: $LiNi_xMn_yCo_{1-x-y}O_2$ (where $0 \le x \le 1$ and $0 \le y \le 1$), $LiNi_xMn_{1-x}O_2$ (where $0 \le x \le 1$), $Li_{1+x}MO_2$ (where M is one of Mn, Ni, Co, and Al and $0 \le x \le 1$), $Li_2MnO_3$, $LiMn_2O_4$, $LiNi_{0.5}Mn_{1.5}O_4$, $LiV_2(PO_4)_3$, $LiFePO_4$, $LiCoPO_4$, $LiMnPO_4$, $LiVPO_4F$, $LiFeBO_3$, $LiCoBO_3$, $LiMnBO_3$, $Li_2FeSiO_4$, $Li_2MnSiO_4$, $LiMnSiO_4F$, $LiFeSiO_4$, $LiFe_{0.5}M_{0.5}SiO_4$ (where M is one of magnesium (Mg) and aluminum (Al)), silicon, silicon oxide, graphite, graphene, carbon nanotubes (CNTs), lithium titanium oxide ($Li_4Ti_5O_{12}$), vanadium oxide ($V_2O_5$), tin oxide (SnO), titanium dioxide ($TiO_2$), iron sulfide (FeS), lithium metal, and combinations thereof.

15. The method of claim 12, wherein the electroactive layer comprises one or more laminated layers and the first end of the second current collector is disposed between first and second layers of the one or more laminated layers.

16. The method of claim 12, wherein the electroactive layer is porous and has a porosity greater than or equal to about 10 vol. % to less than or equal to about 60 vol. %.

17. The method of claim 12, wherein the electroactive layer further comprises one or more electrically conductive materials.

18. The method of claim 12, wherein the electroactive layer further comprises one or more binders selected from poly(tetrafluoroethylene) (PTFE), sodium carboxymethyl cellulose (CMC), styrene-butadiene rubber (SBR), poly(vinylidene fluoride) (PVDF), nitrile butadiene rubber (NBR), styrene ethylene butylene styrene copolymer (SEBS), styrene butadiene styrene copolymer (SBS), lithium polyacrylate (LiPAA), sodium polyacrylate (NaPAA), sodium alginate, lithium alginate, and ethylene propylene diene monomer (EPDM).

19. The method of claim 12, wherein the current is a constant current greater than or equal to about C/100 to less than or equal to about 10C.

* * * * *